United States Patent
Tuomi et al.

(10) Patent No.: US 12,505,604 B2
(45) Date of Patent: *Dec. 23, 2025

(54) HYBRID BINNING

(71) Applicant: Advanced Micro Devices, Inc., Santa Clara, CA (US)

(72) Inventors: Mika Tuomi, Noormarkku (FI); Kiia Kallio, Inkoo As (FI); Ruijin Wu, San Diego, CA (US); Anirudh R. Acharya, San Diego, CA (US); Vineet Goel, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,166

(22) Filed: Apr. 11, 2024

(65) Prior Publication Data

US 2024/0257435 A1    Aug. 1, 2024

Related U.S. Application Data

(63) Continuation of application No. 17/033,259, filed on Sep. 25, 2020, now Pat. No. 11,972,518.

(60) Provisional application No. 62/963,414, filed on Jan. 20, 2020.

(51) Int. Cl.
*G06T 15/00* (2011.01)
*G06T 1/20* (2006.01)
*G06T 15/08* (2011.01)

(52) U.S. Cl.
CPC ............. *G06T 15/005* (2013.01); *G06T 1/20* (2013.01); *G06T 15/08* (2013.01)

(58) Field of Classification Search
CPC .......... G06T 15/005; G06T 1/20; G06T 15/08
See application file for complete search history.

(56) References Cited

U.S. PATENT DOCUMENTS

| | | |
|---|---|---|
| 7,505,036 B1 | 3/2009 | Baldwin |
| 10,169,906 B2 | 1/2019 | Mantor et al. |
| 2004/0066384 A1 | 4/2004 | Ohba |
| 2004/0233207 A1 | 11/2004 | Morphet |
| 2007/0296725 A1* | 12/2007 | Steiner .................. G06T 15/005 345/505 |
| 2011/0216069 A1 | 9/2011 | Keall et al. |
| 2011/0292032 A1 | 12/2011 | Yang |
| 2013/0135341 A1* | 5/2013 | Seetharamaiah ....... G06T 11/40 345/522 |

(Continued)

*Primary Examiner* — Kee M Tung
*Assistant Examiner* — Khoa Vu
(74) *Attorney, Agent, or Firm* — Volpe Koenig

(57) ABSTRACT

A processing device and a method of tiled rendering of an image for display is provided. The processing device includes memory and a processor. The processor is configured to receive the image comprising one or more three dimensional (3D) objects, divide the image into tiles, execute coarse level tiling for the tiles of the image and execute fine level tiling for the tiles of the image. The processing device also includes same fixed function hardware used to execute the coarse level tiling and the fine level tiling. The processor is also configured to determine visibility information for a first one of the tiles. The visibility information is divided into draw call visibility information and triangle visibility information for each remaining tile of the image.

20 Claims, 7 Drawing Sheets

(56) References Cited

U.S. PATENT DOCUMENTS

| | | |
|---|---|---|
| 2013/0342547 A1* | 12/2013 | Lum .................. G06T 11/40 |
| | | 345/501 |
| 2015/0302546 A1* | 10/2015 | Balci .................. G06T 11/40 |
| | | 345/522 |
| 2016/0371873 A1 | 12/2016 | Mantor et al. |
| 2017/0018121 A1 | 1/2017 | Lawson et al. |
| 2018/0061002 A1 | 3/2018 | Lee et al. |
| 2018/0189923 A1* | 7/2018 | Zhong ............... G06T 15/005 |
| 2018/0240268 A1 | 8/2018 | Nevraev et al. |
| 2018/0307490 A1* | 10/2018 | Hakura ............. G06T 15/005 |
| 2019/0220947 A1* | 7/2019 | Yang .................. G06T 11/40 |

* cited by examiner

HYBRID BINNING

CROSS REFERENCE TO RELATED APPLICATION

This application is a continuation of U.S. patent application Ser. No. 17/033,259, entitled "HYBRID BINNING," filed on Sep. 25, 2020, the entirety of which is hereby incorporated herein by reference, which claims priority to U.S. provisional application No. 62/963,414, entitled "HYBRID BINNING," filed on Jan. 20, 2020, the entirety of which is hereby incorporated herein by reference.

BACKGROUND

Graphics processing includes the rendering of a three dimensional (3D) scene onto a two dimensional (2D) screen. The 3D scene is rendered on a display screen, via a graphics pipeline, which includes different stages of processing. Graphics processing commands of a command stream are received (e.g., from an application) and computation tasks are provided (e.g., to an accelerated processing device, such as a GPU) for execution of the tasks.

Graphics are rendered on a display screen using primitives (e.g., triangles, quadrilaterals or other geometric shapes). The graphics processing commands include, for example, the number of primitives, the location of each primitive and attributes of each primitive to be rendered on the display screen.

BRIEF DESCRIPTION OF THE DRAWINGS

A more detailed understanding can be had from the following description, given by way of example in conjunction with the accompanying drawings wherein.

DETAILED DESCRIPTION

Figure 1:
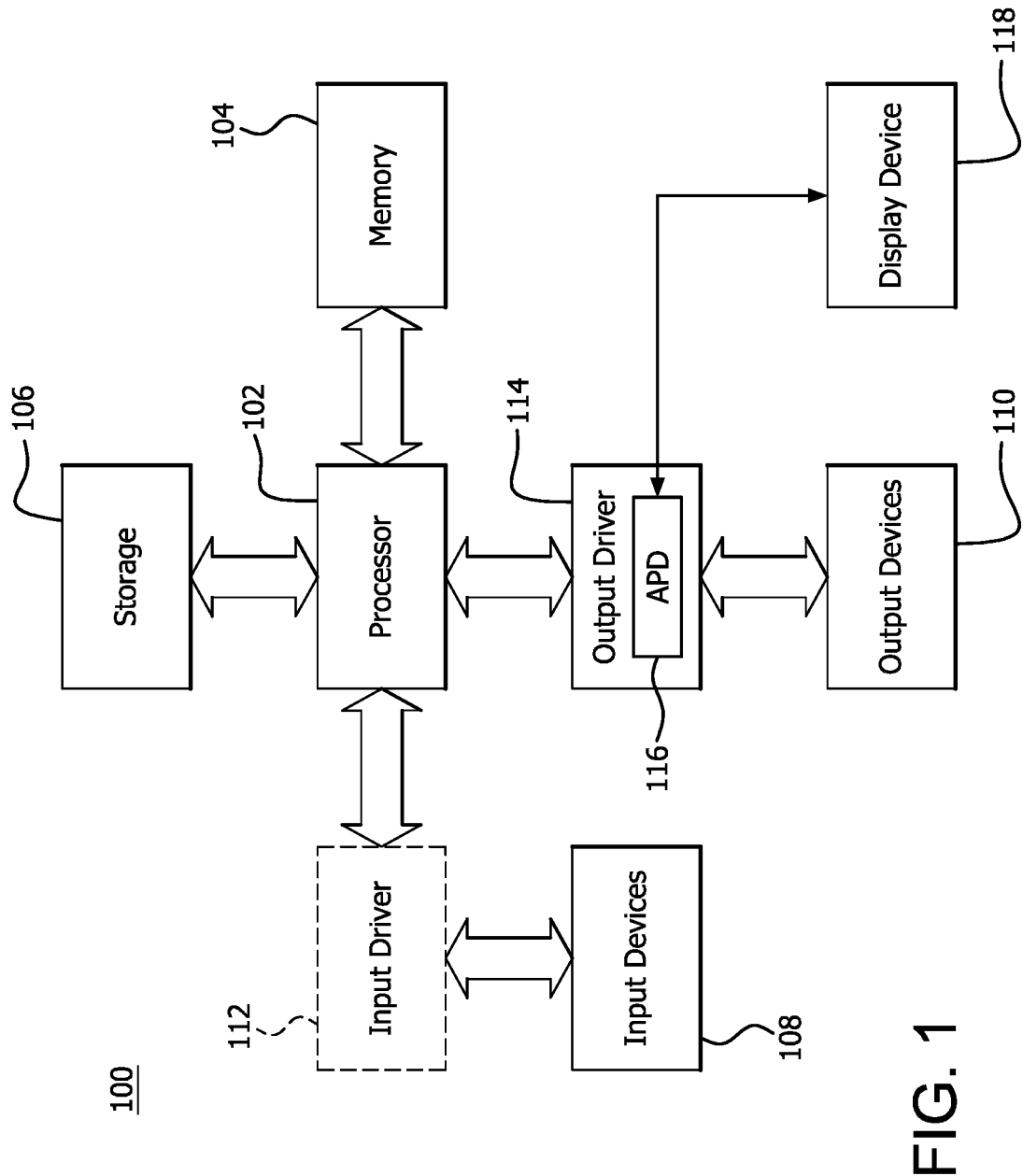
FIG. 1 is a block diagram of an example device in which one or more features of the disclosure can be implemented.

The graphics pipeline can be simplified to include a front end geometry portion and a back end portion. For example, the front end geometry portion of the pipeline includes several shader stages (e.g., vertex shader stage, hull shader stage, tesselator stage, domain shader stage and geometry shader stage). During the shader stages, the primitives are received as 3D objects and transformed to 2D objects to be rendered onto a 2D screen. The back end portion includes a rasterizer stage and pixel shader stage. During the rasterizer stage, an on-screen location of each primitive to be projected onto the 2D screen is determined. For example, during rasterization, an accelerated processing device (e.g., GPU) determines, for each primitive, which pixels (or sub-pixel samples) correspond to each primitive to be rendered onto the 2D screen. During the pixel shader stage, values (e.g., brightness and color) are calculated for the pixels corresponding to the primitives.

The data is processed (e.g., by the GPU) more efficiently by reusing previously processed data that is stored locally (e.g., data stored in cache of GPU) rather than processing the data using remote memory (e.g., main memory). Tiling (or binning) is a technique which reduces the amount of local memory (e.g., cache) and bandwidth used to render a frame in comparison to rendering the entire frame at once. Tiling splits the frame into sections (e.g., tiles or bins) and renders one tile of a frame before rendering another tile of the frame. For example, if a frame (or image) is split into four equal tiles (i.e., top left quadrant, top right quadrant, bottom left quadrant and bottom right quadrant), a first tile (e.g., top left quadrant) is rendered before proceeding to render one of the next tiles. Then, one of the other tiles (e.g., top right quadrant) is rendered before proceeding to render one of the last two tiles, and so on, until each of the tiles of the frame are rendered.

Conventional tiling techniques include coarse level tiling (i.e., larger tiles and smaller number of tiles or bins per frame) and fine level tiling (i.e., smaller tiles and larger number of tiles or bins per frame). Because there are a smaller number of tiles per frame, coarse level tiling results in less tiling (binning) overhead than fine level tiling, but includes an overall lower cache hit rate than fine level tiling. Fine level tiling includes a higher cache hit rate than coarse level tiling less tiling, but results in higher tiling overhead than fine level tiling.

The present application discloses apparatuses and methods which use both coarse level tiling and fine level tiling in a unique and efficient way to provide efficient tile rendering. The present application executes coarse level tiling for a coarse tile and fine level tiling, for fine tiles of the coarse tile, before proceeding to the next coarse tile to execute coarse level tiling and fine level tiling. The present application uses the same fixed function hardware to execute coarse level tiling and fine level tiling, providing the advantages afforded from coarse level tiling and fine level without the cost of additional hardware.

The present application provides a method of tiled rendering of an image for display. The method includes receiving the image comprising one or more three dimensional (3D) objects, dividing the image into tiles, executing coarse level tiling for the tiles of the image and executing fine level tiling for the tiles of the image.

The present application provides a processing device for tiled rendering of an image for display. The processing device includes memory and a processor. The processor is configured to receive the image comprising one or more three dimensional (3D) objects, divide the image into tiles, execute coarse level tiling for the tiles of the image and execute fine level tiling for the tiles of the image.

The present application provides a non-transitory computer readable medium comprising instructions for causing a computer to execute a method of tiled rendering of an image for display which includes receiving the image comprising one or more three dimensional (3D) objects, dividing the image into tiles; executing coarse level tiling for the tiles of the image; and executing fine level tiling for the tiles of the image.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
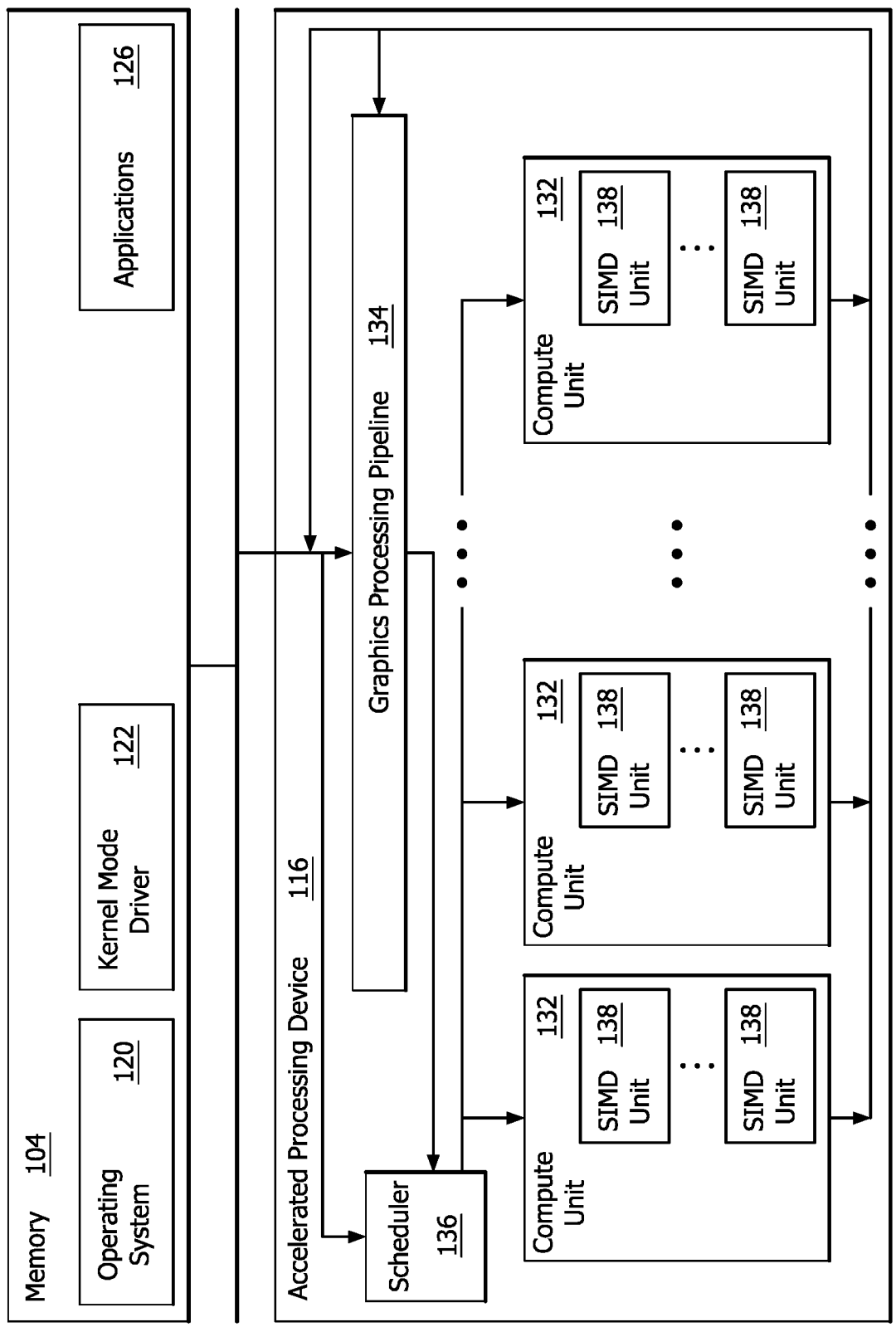
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image, divide the image into tiles, execute coarse level tiling for the tiles of the image, divide the tiles into fine tiles and execute fine level tiling of the image. Optionally, the front end geometry processing of a primitive determined to be in a first one of the tiles can be executed concurrently with the visibility pass.

Figure 3:
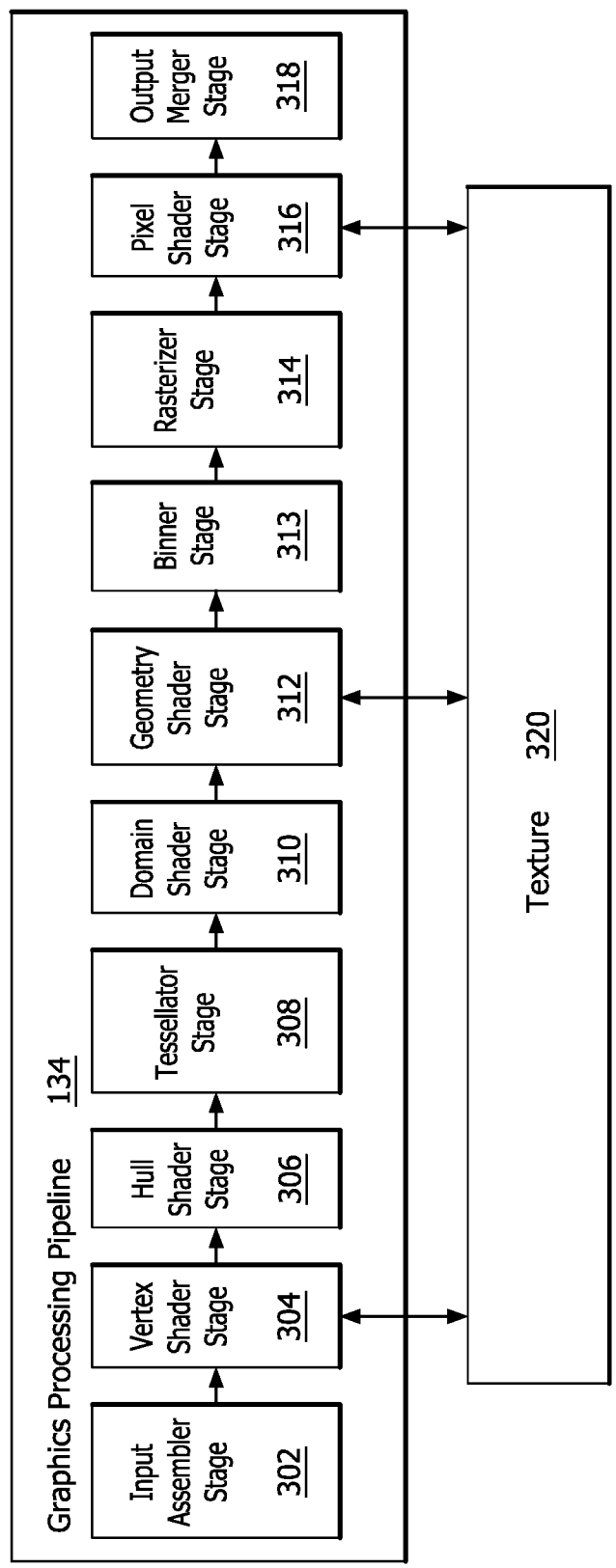
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

Stages 302 to 313 represent the front end geometry processing portion of the graphics processing pipeline 134. Stages 314 to 318 represent the back end pixel processing portion of the graphics processing pipeline 134.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The binner (tiler) stage 313 is the last stage of the front end processing. The binner stage performs a coarse rasterization to determine if a tile (or bin) of the frame (or image) overlaps with primitives. For example, the binner stage includes visibility checking (i.e., a visibility pass) and tile walking for the primitives determined to be in each tile. The binner stage 313 is performed by fixed function hardware.

As described above, stages 314-318 represent the back end processing of the graphics processing pipeline 134. The rasterizer stage 314 accepts and rasterizes simple primitives and generated upstream. Rasterization includes determining which screen pixels (or sub-pixel samples) are covered by a particular primitive. For example, the rasterizer stage 314 converts the primitive (e.g., a triangle) to screen space pixels, testing which pixel is covered by the primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
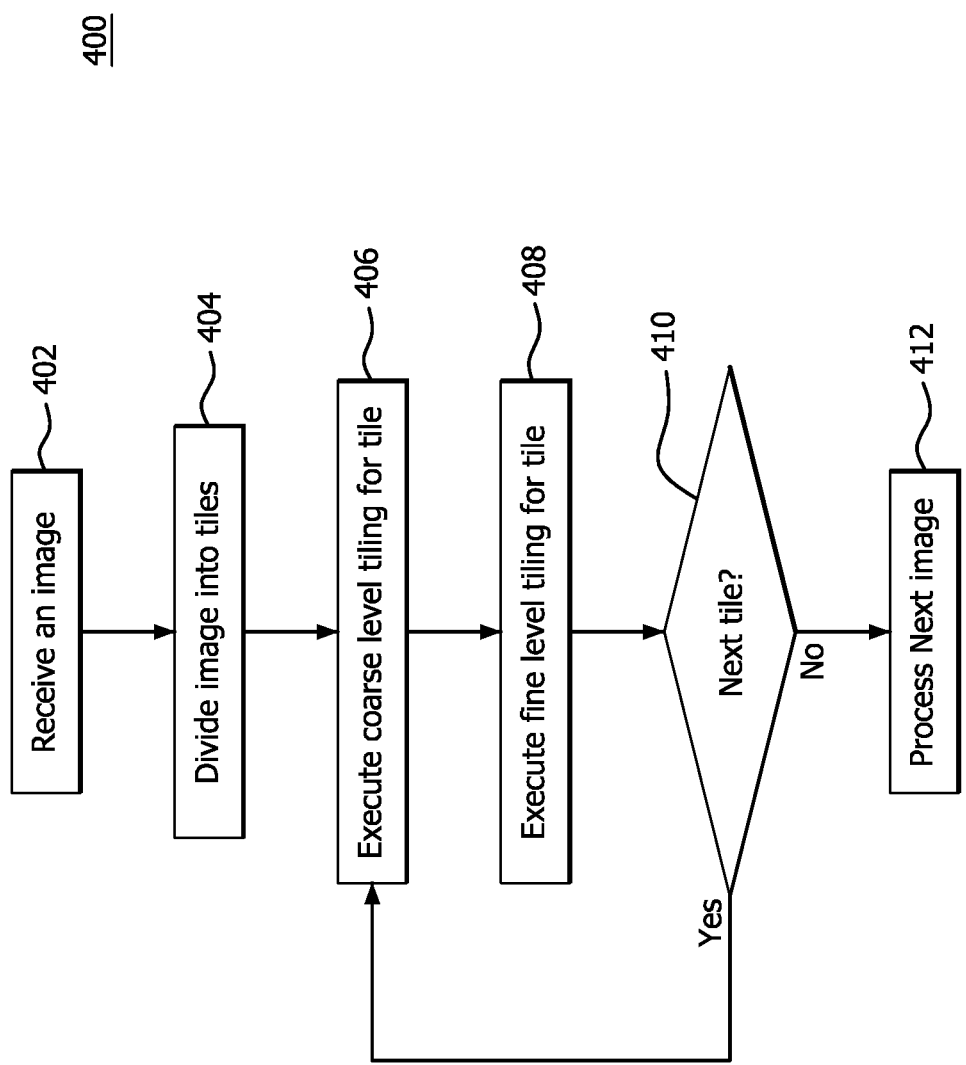
FIG. 4 is a flow diagram illustrating an example method of rendering of an image for display according to features of the disclosure.
Figure 5:
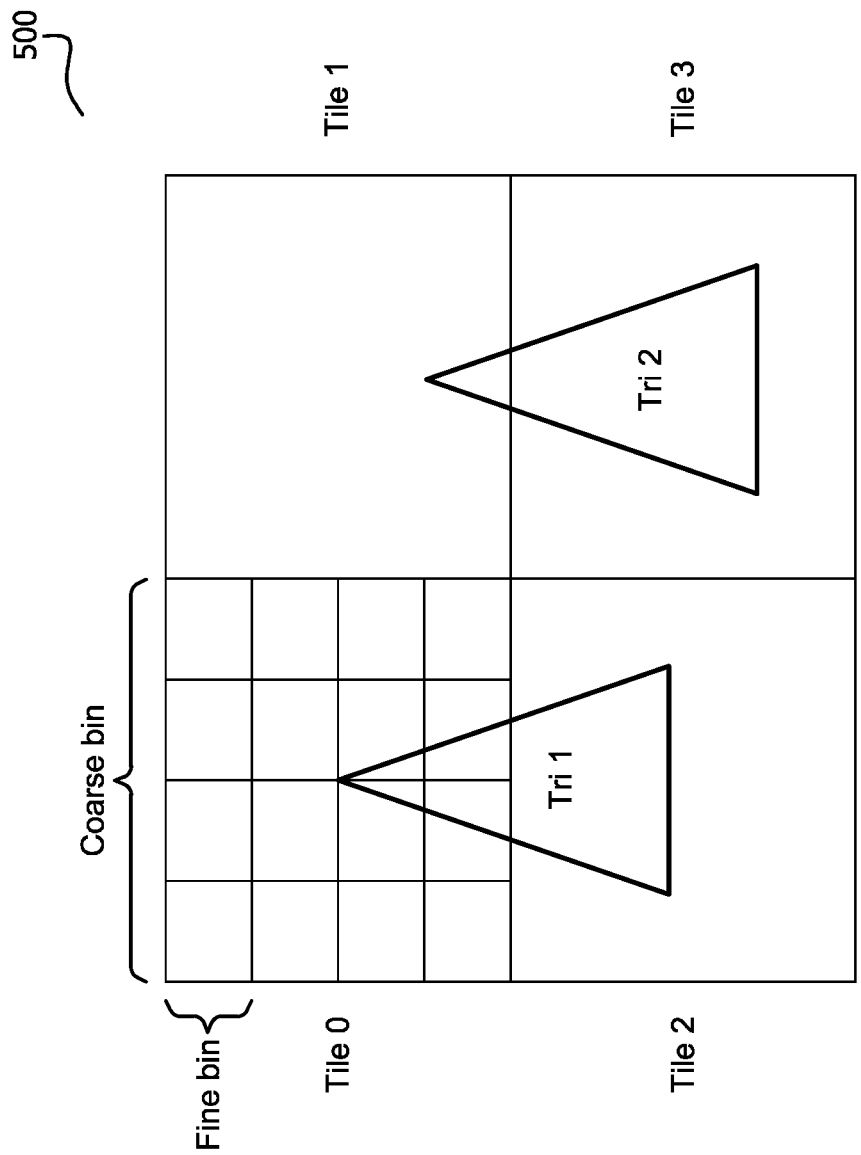
FIG. 5 is a schematic diagram illustrating an example of rendering an image for display according to features of the disclosure.

FIG. 4 is a flow diagram illustrating an example method of rendering of an image for display according to features of the disclosure. FIG. 5, which is used to illustrate the method in FIG. 4, is a schematic diagram illustrating an example of rendering an image 500 for display according to features of the disclosure.

As shown in block 402, the method 400 includes receiving an image comprising one or more 3D objects. For example, the image is received by APD 116. The image can include any number of objects to be transformed for rendering on a 2D display screen.

As shown in block 404, the method 400 includes dividing the image into a plurality of tiles. For simplified explanation, the example shown in FIG. 5 includes an image (or frame) 500 which is split into four equal tiles (i.e., top left quadrant, top right quadrant, bottom left quadrant and bottom right quadrant). Images (or frames) can, however, be split into any number of tiles (e.g., 32 tiles) for coarse level tiling. The number of tiles is independent from the screen resolution.

As shown in block 406, the method 400 includes executing coarse level tiling (binning) of a first tile (bin) of an image. The coarse level tiling is executed via fixed function hardware. That is, the rendering instructions (e.g., instructions from an application or program stored in a command buffer) are executed, via the fixed function hardware, for the first tile (Tile 0) using visibility information (i.e., from the visibility pass executed for the frame) for each tile. Coarse level tiling visibility information is generated during the rendering of Tile 0. The tile is processed on a pixel granularity and it is determined (e.g., by an accelerated processor, such as a GPU), during rasterization, whether or not pixels corresponding to a primitive are located in the tile. For example, the coarse level tile visibility information generated for Tile 0 indicates that a triangle (Tri 1) is located in Tile 0.

As shown in block 408, before coarse level tiling is executed for the next tile (i.e., Tile 1 in FIG. 5), fine level tiling is executed for Tile 0. That is, as shown in FIG. 5, Tile 0 is divided into a number of fine (smaller) tiles. Any number of fine tiles can be used to implement features of the present application. The fine level tiling (e.g., primitive batch tiling), is executed via the same fixed function hardware used to execute the coarse level tiling (as described in more detail below with regard to FIG. 6), which utilizes local memory (e.g., on-chip cache) to accumulate a batch of primitives (e.g., triangles) and renders the primitives one fine tile at a time.

As shown in block 410, it is determined whether the image (frame) includes a next tile. When it is determined that the image includes a next tile, the method 400 proceeds back to block 406 to execute coarse level tiling for the next tile and then fine level tiling is executed for the next tile. For example, using the example shown in FIG. 5, when it is determined that the image 500 includes a next tile (Tile 1), coarse level tiling is executed for the Tile 1 at block 406 and then fine level tiling is executed for Tile 1. The method then proceeds to execute coarse level tiling and fine level tiling for each remaining tile in the image. For example, using the example shown in FIG. 5, the method 400 proceeds to execute coarse level tiling and fine level tiling for Tile 2 and then executes coarse level tiling and fine level tiling for Tile 3.

When it is determined, at block 410, that the image does not include a next tile, the method proceeds to block 412 to process the next image (frame). For example, using the example shown in FIG. 5, when it is determined, at block 410, that the image 500 does not include a next tile (i.e., after coarse level tiling and fine level tiling are executed for Tile 3, the method 400 proceeds to block 412 to render the next image (frame).

Figure 6:
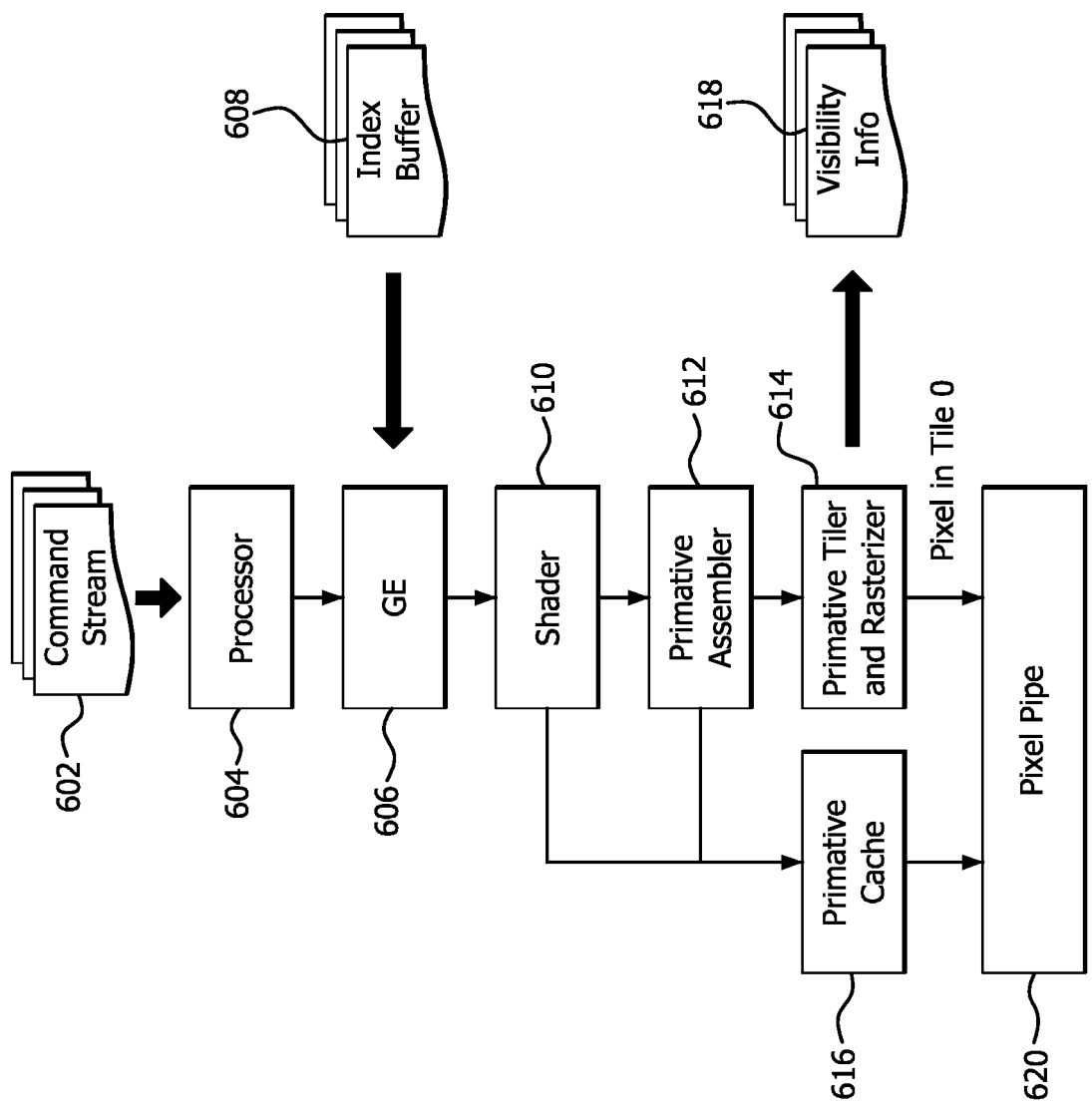
FIG. 6 is a flow diagram illustrating an example method of rendering a first tile of an image for display according to features of the disclosure.

FIG. 6 is a block diagram of components of an example device illustrating an example flow of rendering a first tile of an image for display according to features of the disclosure. FIG. 6 illustrates, for example, executing coarse level tiling and fine level tiling of the first tile (Tile 0) of the image 500 shown in FIG. 5.

As shown in FIG. 6, instructions are received via command stream 602 by a processor 604 (e.g., GPU) to execute rendering of a tile of an image. The instructions are, for example, stored in a command buffer (not shown). The processor 604 provides, to the geometry engine (GE) 606 the attributes of the primitives (e.g., triangles) to be rendered.

The GE 606 receives index information, for example from index buffer 608, and communicates the attribute information, provided by the processor 604, to the shader (non-fixed function hardware) for processing. For example, vertices of triangles are stored locally (e.g., in a vertices buffer). The index information indicates, for each triangle, which 3 points, from the vertices stored in the vertex buffer, is the vertex of the triangle. That is, the index information describes the connectivity of the vertices. For example, 2 triangles, not sharing an edge, are composed of 6 vertices, while 2 triangles, sharing an edge, are composed of 4 vertices. For the 2 triangles composed of 6 vertices, the index of the 2 triangles can be (0, 1, 2) (3, 4, 5) and for the 2 triangles composed of 4 vertices, the index of the 2 triangle can be (0, 1, 2) (1, 2, 3). The GE can be implemented in hardware (e.g., fixed function hardware), software or a combination of hardware and software.

The shader 610 receives the primitives as 3D objects and transforms the primitives to 2D objects to be rendered onto a 2D screen. For example, the shader 610 determines the locations of the vertices of the triangles in the frame. The location information is provided to the primitive assembler 612. Additional information (e.g., color and texture information) is also provided to a primitive cache portion 616 of local memory.

The primitive assembler 612 uses the location information, determined by the shader 610, to combine the vertices and determine the position of each triangle in the frame from the location of the vertices of each triangle. The position information is then provided to the primitive tiler and rasterizer 614 as well as the primitive cache portion 616.

The primitive tiler and rasterizer 614 represents a fixed function hardware block which performs two different functions. That is, the same fixed function hardware is used to execute both the coarse level tiling and tiling fine level tiling. The primitive tiler and rasterizer 614 divides the image (frame) into the coarse tiles and divides the coarse tiles into fine tiles. The primitive tiler and rasterizer 614 executes coarse level tiling (i.e., coarse level rasterization) to determine in which coarse tile each primitive (e.g., triangle) is located. That is, primitive tiler and rasterizer 614 determines, for each coarse tile, the visibility of each triangle in the coarse tile. For example, using the example shown in FIG. 5, primitive tiler and rasterizer 614 determines that the triangle, TRI 1, is located in Tile 0. The location information is stored in local memory (e.g., cache memory) as visibility information 618. The primitive tiler and rasterizer 614 also executes fine level tiling, which utilizes local memory (e.g., on-chip cache) to accumulate a batch of primitives (e.g., triangles), and renders the primitives one fine tile at a time.

The primitive tiler and rasterizer 614 determines an on-screen location of each primitive to be projected onto the 2D screen. For example, during rasterization, an accelerated processing device (e.g., GPU) determines, for each primitive, which pixels (or sub-pixel samples) correspond to each primitive to be rendered onto the 2D screen. During the pixel shader stage, values (e.g., brightness and color) are calculated for the pixels corresponding to the primitives and provided to the pixel pipe 620.

Figure 7:
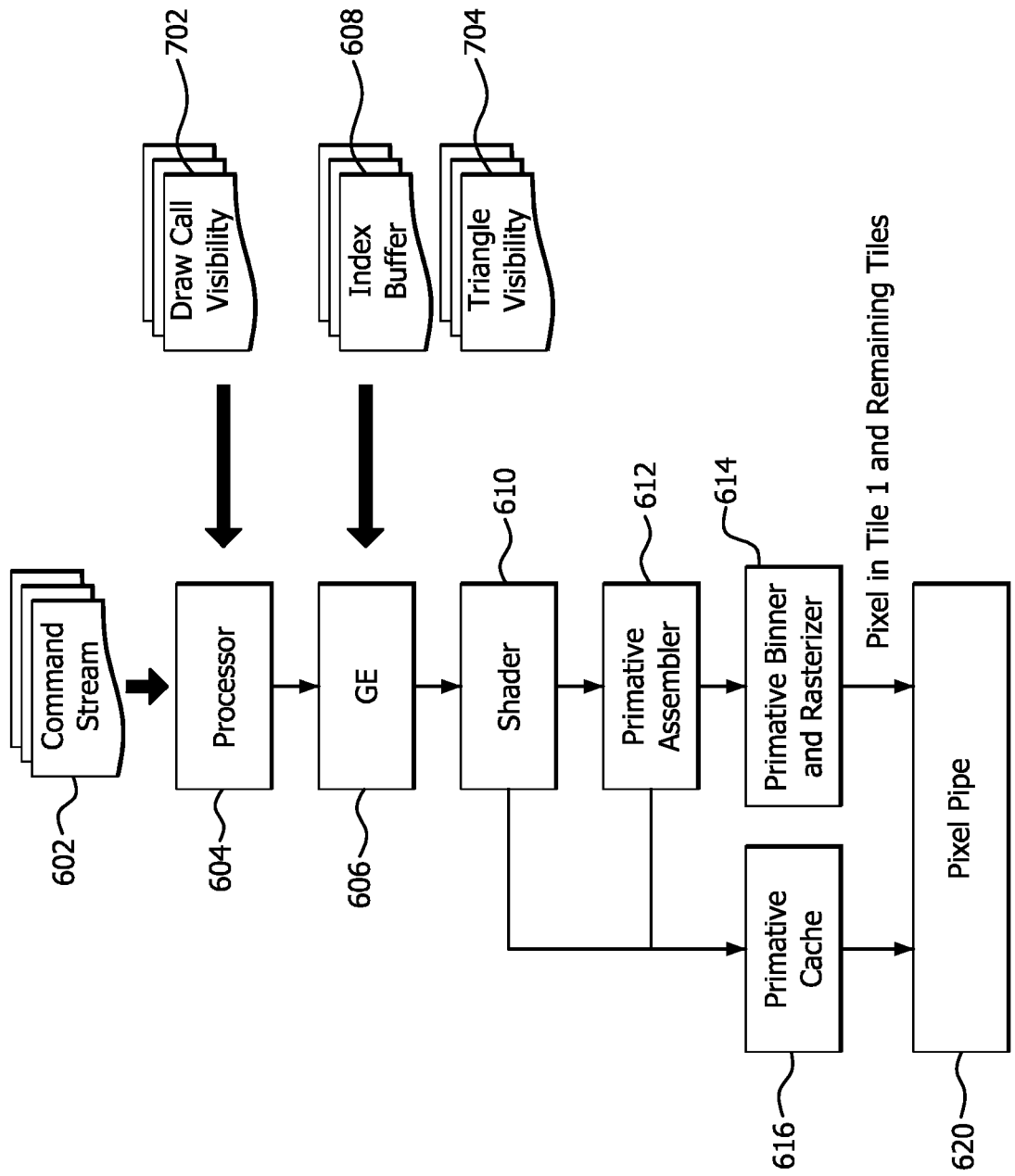
FIG. 7 is a flow diagram illustrating an example method of rendering a next tile of an image for display according to features of the disclosure.

FIG. 7 is a flow diagram illustrating an example method of rendering each of the other tiles (i.e., remaining tiles other than the first tile) of an image for display according to features of the disclosure. FIG. 7 illustrates, for example, executing coarse level tiling and fine level tiling of Tile 1, Tile 2 and Tile 3 tile of the image 500 shown in FIG. 5.

When rendering each of the remaining tiles, the processor 404 executes the same instructions as the instructions for Tile 0, but the visibility information 418 stored in local memory, as shown in FIG. 6, is utilized to reduce processing (e.g., unnecessary processing) of data (e.g., primitives) for the remaining tiles. For example, using the example shown in FIG. 5, it is determined, during the processing of Tile 0, triangle 1 (Tri 1), shown in FIG. 5, is determined not to be located in Tile 1. Accordingly, the processing of Tri 1 is avoided when Tile 1 is processed.

As shown in FIG. 7, the stored visibility information 418 is divided into two types of visibility information, namely draw call visibility information 702 and triangle visibility information 704. The visibility information 418 indicates the draws (each including one or more primitives, such as triangles) for each tile. The draw call visibility information 702 indicates which draws are included for a tile being processed and the triangle visibility information 704 indicates which triangle of each draw is included in the tile being processed.

For example, using the example image 500 in FIG. 5 which includes 2 triangles (Tri 1 and Tri 2), an instruction may be "Draw 1: Tri 1, Tri 2." That is, the instruction indicates the draw (e.g., Draw 1) and the triangles inside the draw (e.g., Draw 1 includes Tri 1 and Tri 2). The processor 604 receives the same instruction for each tile. For example, assuming there is only 1 Draw instruction, when processing the first tile (Tile 0), the visibility information 618 for Tile 0 is determined as Tri 1 is visible in Tile 0, but Tri 2 is not visible in Tile 0. When processing the second tile (Tile 1), the draw call visibility information 702 indicates that Draw 1 includes 1 triangle and the triangle visibility information 704 for Tile 1 is determined to be Tri 2 because it was determined during the processing of Tile 0 that Tri 1 is not in Tile 1.

When processing Tile 2, the draw call visibility information 702 again indicates that Draw 1 includes only 1 triangle and the triangle visibility information 704 for Tile 2 is determine as Tri 1. When processing Tile 3, the draw call visibility information 702 again indicates that Draw 1 includes only 1 triangle and the triangle visibility information 704 for Tile 3 is determined as Tri 2. Accordingly, unnecessary processing (e.g., a second triangle in Tile 2, Tile 2 and Tile 3) is avoided. The remaining blocks 610-620 in FIG. 7 then perform the same functions as described above with regard to FIG. 6.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the APD 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of rendering, the method comprising:
performing coarse level tiling by identifying a first set of primitives that overlap a first coarse tile, from an overall set of primitives;
performing fine level tiling by processing the first set of primitives in order of a plurality of fine tiles, wherein the first coarse tile is divided into the plurality of fine tiles, and the fine level tiling includes rendering the first set of primitives in fine tile order; and
subsequent to executing the coarse level tiling for the first coarse tile, performing coarse level tiling and fine level tiling for a second set of primitives that overlap a second coarse tile.

2. The method of claim 1, wherein the coarse level tiling and the fine level tiling for the second set of primitives is performed after performing the coarse level tiling for the first set of primitives and after the fine level tiling for the first set of primitives.

3. The method of claim 1, wherein the processing the first set of primitives comprises rendering the first set of primitives in order of the plurality of fine tiles.

4. The method of claim 1, further comprising performing coarse level tiling by processing each coarse tile of a render target that includes the first coarse tile, in coarse tile order.

5. The method of claim 1, wherein performing the coarse level tiling comprises determining visibility information indicating which primitives are visible in which coarse tiles.

6. The method of claim 5, wherein for each coarse tile of the coarse tiles, the visibility information indicates which draw calls specify primitives that are visible in the coarse tile.

7. The method of claim 1, wherein after performing coarse tiling for the first coarse tile, coarse tiling is performed before fine tiling.

8. The method of claim 1, wherein the fine level tiling does not process primitives not indicated as visible by the coarse level tiling.

9. A device comprising:
a memory configured to store primitives; and
a processor configured to:
perform coarse level tiling by identifying, from the primitives, a first set of primitives that overlap a first coarse tile, from an overall set of primitives;
performing fine level tiling by processing the first set of primitives in order of a plurality of fine tiles, wherein the first coarse tile is divided into the plurality of fine tiles, and the fine level tiling includes rendering the first set of primitives in fine tile order; and
subsequent to executing the coarse level tiling for the first coarse tile, performing coarse level tiling and fine level tiling for a second set of primitives that overlap a second coarse tile.

10. The device of claim 9, wherein the coarse level tiling and the fine level tiling for the second set of primitives is performed after performing the coarse level tiling for the first set of primitives and after the fine level tiling for the first set of primitives.

11. The device of claim 10, wherein the processing the first set of primitives comprises rendering the first set of primitives in order of the plurality of fine tiles.

12. The device of claim 10, wherein the processor is further configured to perform coarse level tiling by processing each coarse tile of a render target that includes the first coarse tile, in coarse tile order.

13. The device of claim 10, wherein performing the coarse level tiling comprises determining visibility information indicating which primitives are visible in which coarse tiles.

14. The device of claim 13, wherein for each coarse tile of the coarse tiles, the visibility information indicates which draw calls specify primitives that are visible in the coarse tile.

15. The device of claim 9, wherein after performing coarse tiling for the first coarse tile, coarse tiling is performed before fine tiling.

16. The device of claim 9, wherein the fine level tiling does not process primitives not indicated as visible by the coarse level tiling.

17. A non-transitory computer-readable medium storing instructions that, when executed by a processor, cause the processor to perform operations comprising:
performing coarse level tiling by identifying a first set of primitives that overlap a first coarse tile, from an overall set of primitives;
performing fine level tiling by processing the first set of primitives in order of a plurality of fine tiles, wherein the first coarse tile is divided into the plurality of fine tiles, and the fine level tiling includes rendering the first set of primitives in fine tile order; and
subsequent to executing the coarse level tiling for the first coarse tile, performing coarse level tiling and fine level tiling for a second set of primitives that overlap a second coarse tile.

18. The non-transitory computer-readable medium of claim 17, wherein the coarse level tiling and the fine level tiling for the second set of primitives is performed after performing the coarse level tiling for the first set of primitives and after the fine level tiling for the first set of primitives.

19. The non-transitory computer-readable medium of claim 17, wherein the processing the first set of primitives comprises rendering the first set of primitives in order of the plurality of fine tiles.

20. The non-transitory computer-readable medium of claim 17, wherein the operations further comprise performing coarse level tiling by processing each coarse tile of a render target that includes the first coarse tile, in coarse tile order.

* * * * *